(12) United States Patent
Narayanaswamy et al.

(10) Patent No.: US 8,443,587 B2
(45) Date of Patent: May 21, 2013

(54) METHOD FOR EXHAUST AFTERTREATMENT IN AN INTERNAL COMBUSTION ENGINE

(75) Inventors: Kushal Narayanaswamy, Sterling Heights, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 426 days.

(21) Appl. No.: 12/390,580

(22) Filed: Feb. 23, 2009

(65) Prior Publication Data

US 2010/0212294 A1    Aug. 26, 2010

(51) Int. Cl.
*F01N 3/00*    (2006.01)

(52) U.S. Cl.
USPC .................................. 60/285; 60/286; 60/301

(58) Field of Classification Search
USPC .................... 60/300, 284, 285, 286, 287, 294
See application file for complete search history.

(56) References Cited

U.S. PATENT DOCUMENTS

| | | | |
|---|---|---|---|
| 5,428,955 A * | 7/1995 | Yuuki et al. | 60/276 |
| 5,784,878 A * | 7/1998 | Kato et al. | 60/274 |
| 6,381,955 B1 * | 5/2002 | Morganti et al. | 60/300 |
| 6,467,259 B1 * | 10/2002 | Surnilla et al. | 60/285 |
| 2003/0167756 A1 * | 9/2003 | Szymkowicz | 60/289 |
| 2004/0020190 A1 * | 2/2004 | Yoshida | 60/286 |
| 2006/0080951 A1 * | 4/2006 | Pott et al. | 60/274 |
| 2006/0108163 A1 * | 5/2006 | Kitano et al. | 180/65.2 |
| 2006/0113127 A1 * | 6/2006 | Dong et al. | 180/65.1 |
| 2006/0162321 A1 * | 7/2006 | Zillmer et al. | 60/295 |
| 2008/0282673 A1 * | 11/2008 | Gonze et al. | 60/284 |
| 2012/0260631 A1 * | 10/2012 | Winkler et al. | 60/274 |

FOREIGN PATENT DOCUMENTS

| | | |
|---|---|---|
| CN | 1781789 A | 6/2006 |
| CN | 101306685 A | 11/2008 |
| DE | 19812829 A1 | 10/1998 |
| DE | 10118878 A1 | 10/2002 |
| DE | 101 61 850 A1 | 7/2003 |
| DE | 10310024 A1 | 9/2004 |
| DE | 102006005717 A1 | 8/2007 |
| JP | 2000227038 A * | 8/2000 |
| WO | WO-2008077602 A1 | 7/2008 |

* cited by examiner

*Primary Examiner* — Thomas Denion
*Assistant Examiner* — Patrick Maines

(57) ABSTRACT

An internal combustion engine includes first and second sets combustion chambers fluidly coupled to respective first and second aftertreatment devices. A third aftertreatment device including a supplemental heating device is fluidly coupled to outlets of the first and second aftertreatment devices. The first set of combustion chambers is operated rich and the second set of combustion chambers is operated lean. The supplemental heating device is operated to transfer thermal energy to the exhaust gas feedstream.

18 Claims, 4 Drawing Sheets

METHOD FOR EXHAUST AFTERTREATMENT IN AN INTERNAL COMBUSTION ENGINE

TECHNICAL FIELD

This disclosure relates to operation and control of internal combustion engines, and more specifically to engines selectively operative lean of stoichiometry.

BACKGROUND

The statements in this section merely provide background information related to the present disclosure and may not constitute prior art.

Operating an internal combustion engine under lean of stoichiometry conditions can improve fuel efficiency, but may result in higher oxides of nitrogen ('NOx') emissions. Known aftertreatment systems for internal combustion engines operating lean of stoichiometry can include a three-way catalytic converter followed by a lean-NOx reduction catalyst, also referred to as a lean NOx trap ('LNT device'), which can be used in concert with other exhaust aftertreatment devices, e.g., a selective catalytic reduction device ('SCR device'). Known three-way catalytic converters ('TWC') function to reduce engine-out hydrocarbon ('HC'), carbon monoxide ('CO'), and NOx emissions during stoichiometric engine operation and HC and CO emissions during rich operation.

The SCR device includes a catalyst that promotes the reaction of NOx with a reductant, such as ammonia or urea, to produce nitrogen and water. The reductants may be injected into an exhaust gas feedstream upstream of the SCR device, requiring an injection system, a reductant tank and a control scheme. The tank may require periodic refilling and can freeze in cold climates requiring additional heaters and insulation. Additionally, engine operation may use the TWC to produce ammonia for use as a reductant.

Catalysts used in SCR devices have included vanadium (V) and tungsten (W) on titanium (Ti). Recently, mobile applications have begun adapting base metals including iron (Fe) or copper (Cu) with a zeolite washcoat. Copper catalysts may perform effectively at lower temperatures but have poor thermal durability. Iron catalysts may perform well at higher temperatures but with decreasing reductant storage efficiency.

For mobile applications, SCR devices can have a preferred operating temperature range of 200° C. to 600° C. The temperature range may vary depending on the catalyst. This temperature range can decrease during or after higher load operations. Temperatures greater than 600° C. may cause reductants to breakthrough and degrade the SCR catalysts, while the effectiveness of NOx processing decreases at temperatures lower than 200° C.

The LNT device adsorbs NOx emissions during lean engine operation and operates most effectively within a temperature range between 250° C. to 450° C. with effectiveness decreasing above and below that temperature range. The LNT device reduces the adsorbed NOx emissions only above a light-off temperature. Therefore it is advantageous to maintain the LNT device and SCR device above the light-off temperatures.

SUMMARY

A method for operating an internal combustion engine selectively operative lean of stoichiometry includes fluidly coupling a first aftertreatment device to exhaust ports of a first set of combustion chambers of the internal combustion engine and fluidly coupling a second aftertreatment device to exhaust ports of a second set of combustion chambers of the internal combustion engine. A third aftertreatment device including a first supplemental heating device is fluidly coupled to outlets of the first and second aftertreatment devices. The engine is started and the first set of combustion chambers is operated at a rich air/fuel ratio, the second set of combustion chambers is operated at a lean air/fuel ratio, and the first supplemental heating device is operated to transfer thermal energy to the exhaust gas feedstream.

BRIEF DESCRIPTION OF THE DRAWINGS

One or more embodiments will now be described, by way of example, with reference to the accompanying drawings, in which.

DETAILED DESCRIPTION

Figure 1:
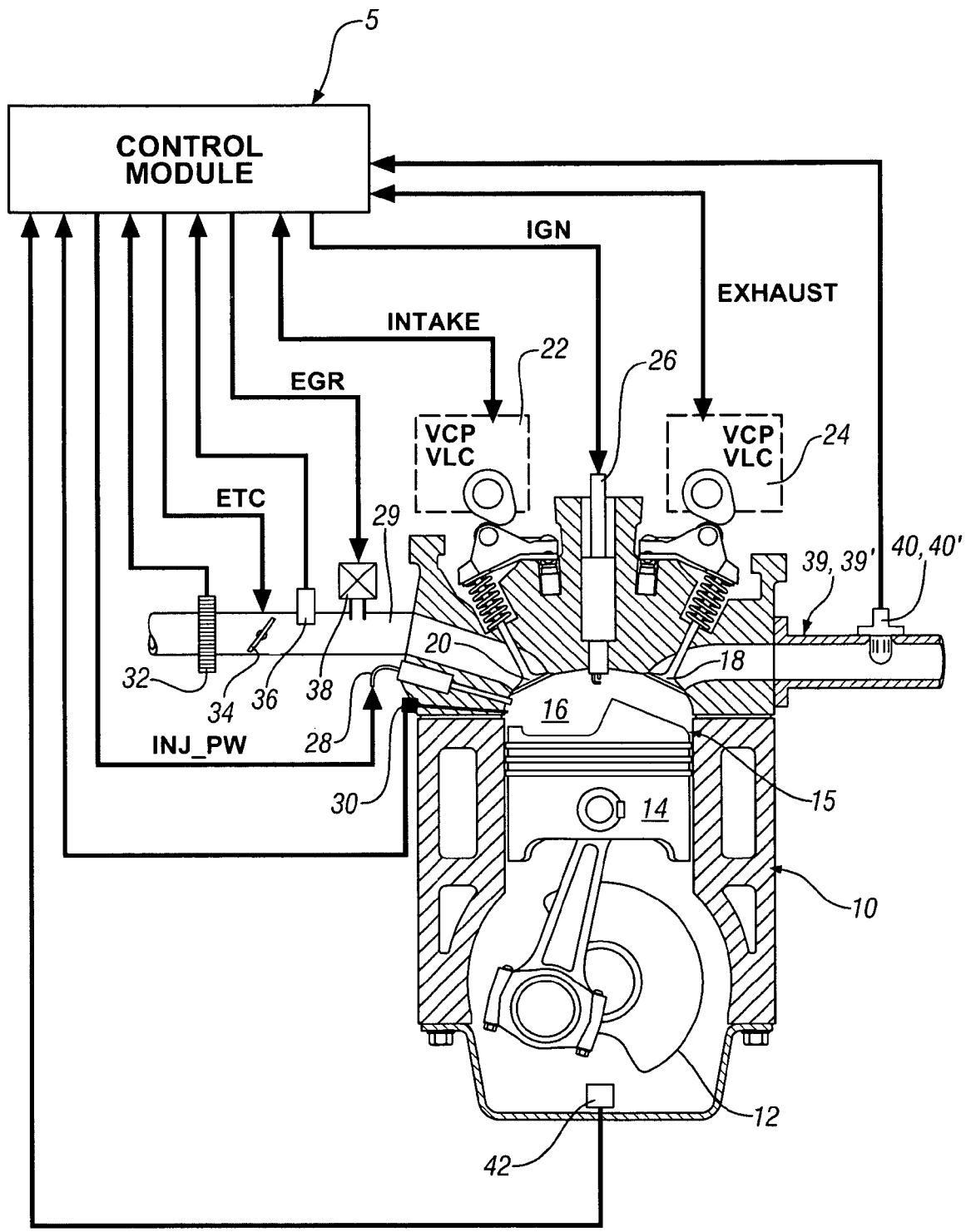
FIG. 1 is a schematic drawing of an exemplary engine system, in accordance with the present disclosure.
Figure 2:
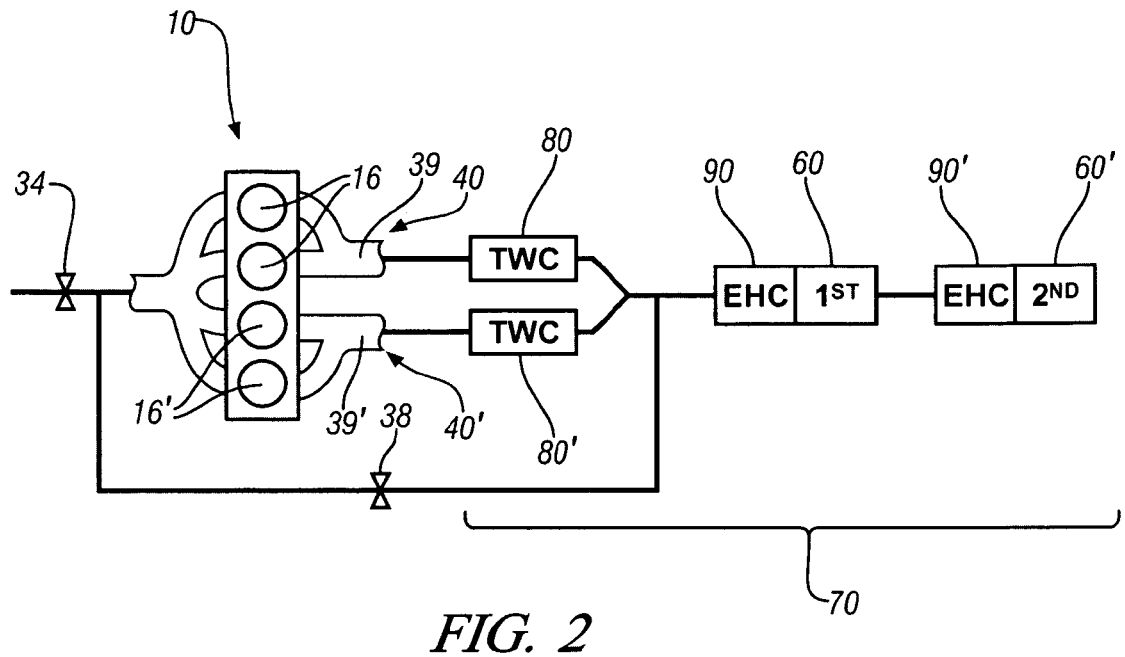
FIG. 2 is a schematic drawing of an exemplary aftertreatment system, in accordance with the present disclosure.

Referring now to the drawings, wherein the depictions are for the purpose of illustrating certain exemplary embodiments only and not for the purpose of limiting the same, FIGS. 1 and 2 schematically show an internal combustion engine 10, an accompanying control module 5, and an exhaust aftertreatment system 70 that have been constructed in accordance with an embodiment of the disclosure. The engine 10 may be selectively operative in a plurality of combustion modes, including a controlled auto-ignition combustion mode, a homogeneous spark-ignition combustion mode, and a stratified-charge spark-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles.

In one embodiment the engine 10 can be coupled to a transmission device (not shown) to transmit tractive power to a driveline of a vehicle (not shown). A transmission can include a hybrid transmission including electric machines operative to transfer tractive torque to a driveline.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system comprises airflow ductwork and devices for monitoring and controlling the air flow. The air intake devices preferably include a mass airflow sensor 32 for monitoring mass airflow and intake air temperature. A throttle valve 34 preferably comprises an electronically controlled device that is used to control air flow to the engine 10 in response to a control signal ('ETC') from the control module 5. A pressure sensor 36 in the intake manifold 29 is adapted to monitor manifold absolute pressure and barometric pressure. An external flow passage recirculates exhaust gases from engine exhaust to the intake manifold 29, having a flow control valve referred to as an exhaust gas recirculation ('EGR') valve 38. The control module 5 is operative to control mass flow of exhaust gas to the intake manifold 29 by controlling opening of the EGR valve 38. There are a first set and a second set of combustion chambers 16 and 16'. The first set of combustion chambers 16 have exhaust valves that are fluidly connected to a first exhaust manifold 39, and the second set of combustion chambers 16' have exhaust valves that are fluidly connected to a second exhaust manifold 39'. The first and second sets of combustion chambers 16 and 16' can each comprise one bank of combustion chambers when the engine 10 is in a V-configuration. The first and second sets of combustion chambers 16 and 16' can each comprise a first half and a second half of the combustion chambers when the engine 10 is in an inline configuration.

Air flow from the intake manifold 29 into each of the combustion chambers 16, 16' is controlled by one or more intake valves 20 for each chamber. Flow of combusted gases from the combustion chambers 16, 16' to the first and second exhaust manifolds 39 and 39' is controlled by one or more exhaust valves 18 for each chamber. Openings and closings of the intake and exhaust valves 20 and 18 are preferably controlled with a dual camshaft (as depicted), the rotations of which are linked and indexed with rotation of the crankshaft 12. In one embodiment, the engine 10 is equipped with devices for controlling valve lift of the intake valves and the exhaust valves, referred to as variable lift control ('VLC') devices. The variable lift control devices are operative to control valve lift, or opening, to one of two distinct steps, e.g., a low-lift valve opening (about 4-6 mm) for low speed, low load engine operation, and a high-lift valve opening (about 8-10 mm) for high speed, high load engine operation. In one embodiment, the engine 10 is further equipped with devices for controlling phasing (i.e., relative timing) of opening and closing of the intake and exhaust valves 20 and 18, referred to as variable cam phasing ('VCP'), to control phasing beyond that which is effected by the two-step VLC lift. In one embodiment, there is a VCP/VLC system 22 for the intake valves 20 and a VCP/VLC system 24 for the engine exhaust valves 18. The VCP/VLC systems 22 and 24 are controlled by the control module 5, and provide signal feedback to the control module 5 for example through camshaft rotation position sensors for the intake camshaft (not shown) and the exhaust camshaft (not shown). The intake and exhaust VCP/VLC systems 22 and 24 have limited ranges of authority over which opening and closing of the intake and exhaust valves 18 and 20 can be controlled. VCP systems can have a range of phasing authority of about 60°-90° of cam shaft rotation, thus permitting the control module 5 to advance or retard opening and closing of one of the intake and exhaust valves 20 and 18. The range of phasing authority is defined and limited by the hardware of the VCP and the control system which actuates the VCP. The intake and exhaust VCP/VLC systems 22 and 24 may be actuated using one of electro-hydraulic, hydraulic, and electric control force, controlled by the control module 5.

The engine 10 includes a fuel injection system, comprising a plurality of high-pressure fuel injectors 28 each adapted to directly inject a mass of fuel into one of the combustion chambers 16, 16' in response to a signal from the control module 5. The fuel injectors 28 are supplied pressurized fuel from a fuel distribution system (not shown).

The engine 10 includes a spark-ignition system by which spark energy is provided to a spark plug 26 for igniting or assisting in igniting cylinder charges in each of the combustion chambers 16, 16' in response to a signal ('IGN') from the control module 5.

The engine 10 is equipped with various sensing devices for monitoring engine operation, including a crank sensor 42 having output ('RPM') and operative to monitor crankshaft rotational position, i.e., crank angle and speed, in one embodiment a combustion sensor 30 adapted to monitor combustion, and exhaust gas sensors 40 and 40' adapted to monitor exhaust gases, comprising an air/fuel ratio sensor in one embodiment. The combustion sensor 30 comprises a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure ('IMEP') for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The control module 5 is preferably a general-purpose digital computer comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The control module has a set of control algorithms, comprising resident program instructions and calibrations stored in the non-volatile memory and executed to provide the respective functions of each computer. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is adapted to receive input signals from an operator (e.g., a throttle pedal position and a brake pedal position) to determine an operator torque request and from the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include NVO and lift of exhaust valve reopening (in an exhaust re-breathing strategy) in one embodiment. The control module 5 can operate to turn the engine on and off during ongoing vehicle operation, and can operate to selectively deactivate a portion of the combustion chambers or a portion of the valves through control of fuel and spark and valve deactivation. The control module 5 can control air/fuel ratio based upon feedback from sensors 40 and 40' including controlling the first set of combustion chambers 16 to a first air/fuel ratio and controlling the second set of combustion chambers 16' to a second, different air/fuel ratio.

The aftertreatment system 70 is fluidly connected to the engine 10 and signally connected to the control module 5. The exemplary exhaust aftertreatment system 70 comprises first and second three-way catalytic converters ('TWC') 80 and 80' preferably close-couple mounted to the engine 10. The first TWC 80 is coupled to the engine 10 via the first exhaust manifold 39 and the second TWC 80' is coupled to the engine 10 via the second exhaust manifold 39'. Outlets of the first and second TWCs 80 and 80' are fluidly combined and connected to an electrically heated converter ('EHC') 90 closely coupled to a first catalytic device 60 ('1$^{ST}$'). The first catalytic device 60 is preferably a lean NOx adsorber ('LNT device'). Alternatively, it can be any one of a catalyzed lean NOx adsorber device, a selective catalytic reduction device ('SCR device'), and a three-way catalytic converter. In one embodiment, the exhaust aftertreatment system 70 includes a second catalytic device 60' ('2$^{ND}$') downstream from the first catalytic device 60. The second catalytic device 60' is preferably an SCR device. Alternatively, it can be any one of a catalyzed lean NOx adsorber device, a LNT device, and an additional TWC. In one embodiment, a second EHC 90' is inserted upstream of the second catalytic device 60' and downstream from the first catalytic device 60.

Sensors (not shown) operative to monitor constituents of the exhaust gas feedstream are inserted in preferred locations of the exhaust aftertreatment system 70 and signally connected to the control module 5. The sensors can monitor one of air/fuel ratio, exhaust gas feedstream temperature, and concentrations of NOx, NH3, oxygen, and other constituents. The temperature sensors can include sensors adapted to monitor temperature of one of the first and second TWCs 80 and 80' and the first and second catalytic devices 60 and 60'. Each sensor generates an output signal monitored by the control module 5 for control and diagnostics of the engine 10 and the aftertreatment system 70.

A LNT device adsorbs NOx in the exhaust gas feedstream, with the amount of adsorption based upon temperature, flowrate, and air/fuel ratio of the exhaust gas feedstream and amount of NOx already adsorbed thereon. The LNT device preferably comprises a substrate (not shown) having a washcoat containing catalytically active material (not shown). The substrate preferably comprises a monolithic element formed from cordierite with a cell density that is preferably 62-96 cells per square centimeter (400 to 600 cells per square inch), and a wall thickness of three to seven mils. The cells of the substrate comprise flow passages through which exhaust gas flows and contacts the catalytically active materials of the washcoat to effect adsorption and desorption of NOx, and other constituents of the exhaust gas feedstream. The washcoat contains alkali and alkali earth metal compounds, e.g., Ba and K, operative to store NOx generated during lean engine operation. The washcoat also contains catalytically active materials, e.g., PGMs comprising Pt, Pd, and Rh, and additives (e.g., Ce, Zr, La). Under rich engine operation when there are excess reductants, e.g., (CO, H2, HCs) in the exhaust gas feedstream, NOx stored on the LNT device are not stable and decompose to release stored NOx. The released NOx can be reduced in the presence of excess reductants at PGM catalyst sites. In one embodiment, loadings for Ba and K range from 5-25 wt %, and PGM loadings range from Pt: 30-120 g/ft3; Pd: 5-50 g/ft3, and Rh: 3-20 g/ft3. Platinum is required for oxidation of NO to NO2, a necessary step for nitrate formation as engine out NOx can comprise >90% NO in one embodiment. A working temperature window for the LNT device is within a range from 250° to 500° C. At temperatures less than 250° C., NO to NO2 oxidation kinetics are too slow to effectively oxidize the NO in the exhaust gas feedstream, and the NOx reduction kinetics under rich engine operation are too slow to regenerate NOx storage sites in a timely manner during ongoing engine operation. At temperatures greater than 500° C., NOx molecules become unstable under lean engine operation, making the LNT device unable to store sufficient amount of NOx molecules. Therefore maintaining the LNT device within the working temperature window is necessary for NOx reduction sufficient to achieve emissions targets. The washcoat adsorbs NOx molecules during lean engine operation, and desorbs and reduces NOx molecules during engine operation that generates a rich exhaust gas feedstream. The control module 5 selectively controls the engine 10 at a rich air/fuel ratio for a period of time. The period of time for rich operation is determined based upon an elapsed time necessary to desorb the adsorbed NOx from the LNT device based upon size of the LNT device and other factors. The LNT device functions as a three-way catalyst at stoichiometric engine operating conditions in the presence of the PGM and Ce and Zr washcoat components.

An exemplary SCR device comprises a substrate coated with a zeolite washcoat and a catalytically active base metal. The substrate preferably comprises a ceramic monolith formed from cordierite with a cell density about 62 to 96 cells per square centimeter (400-600 cells per square inch), and a wall thickness about three to seven mils. The cells of the substrate comprise flow passages through which exhaust gas flows to contact the catalytically active materials to effect adsorption of NH3. The substrate is impregnated with the zeolite washcoat. The zeolite washcoat also contains catalytically active base metals e.g., iron (Fe), copper (Cu), cobalt (Co), nickel (Ni). Alternatively, vanadia-based and/or tungsten (W) on titanium (Ti) compositions may be used as catalysts.

The SCR device can store anhydrous NH3 that can react with NOx molecules. The catalysts adsorb NH3, and the adsorbed NH3 selectively and catalytically reacts with NOx to produce nitrogen and water in the SCR devices 60 and 62. The following equations describe the primary reactions with NH3 within the first and second SCR devices 60 and 62:

$$4NO+4NH_3+O_2 \rightarrow 4N_2+6H_2O \qquad [1]$$

$$3NO_2+4NH_3 \rightarrow 3.5N_2+6H_2O \qquad [2]$$

$$2NO+2NO_2+4NH_3 \rightarrow 4N_2+6H_2O \qquad [3]$$

Multiple secondary reactions may concurrently occur and will vary depending on the type of fuel consumed.

The first and second EHC 90 and 90' are electrically heated structures that convert electric power to thermal energy to transfer heat to the exhaust gas feedstream when operating. In one embodiment, the EHC 90 includes catalytically reactive material, e.g., Pt, which oxidizes unburned HCs in the exhaust gas feedstream. Preferably, the EHC 90 is a metal monolith structure with a density of about 56 cpscm (cells per square centimeter). In one embodiment the EHC 90 is 0.3 liters in volume. The amount of heat transferred to the exhaust gas feedstream from the EHC 90 is preferably controllable and can vary depending upon conditions in the exhaust gas feedstream and/or the LNT device 60, as will be discussed in more detail below. One skilled in the art will recognize that the EHC 90 may receive electric power from a plurality of sources including, e.g., a battery or vehicle alternator system (not shown). The control module 5 operates the EHC 90 by controlling electric power thereto.

Figure 3:
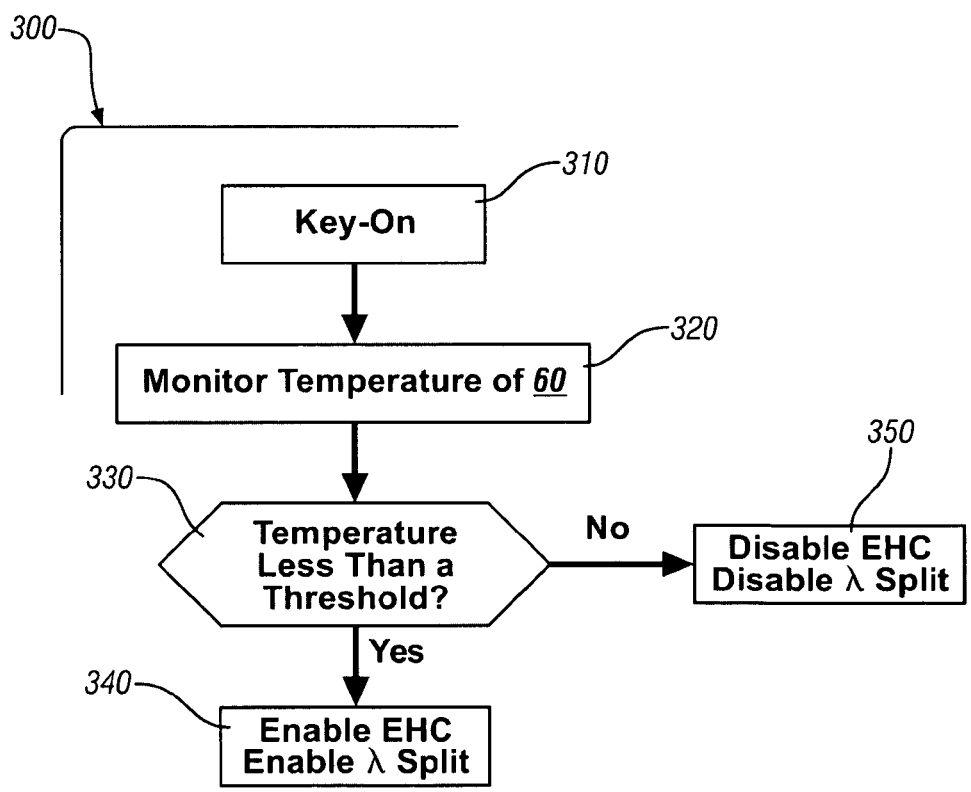
FIG. 3 is a flow chart that illustrates exhaust management during key-on events, in accordance with the present disclosure.

One or more of the elements of the aftertreatment system 70 may be below a minimum temperature threshold, such as during and immediately subsequent to an engine cold start after an extended engine-off period. FIG. 3 shows a first control scheme 300 for managing an exhaust gas feedstream from the engine 10 during a cold-start, until the first catalytic device 60 achieves a minimum threshold temperature. The control scheme 300 is preferably executed as one or more algorithms in the control module 5. The control scheme 300 comprises detecting a key-on event (310). Temperature of the first catalytic device 60 is monitored preferably by a temperature sensor (not shown) placed proximately to the first catalytic device 60 and signally connected to the control module 5 (320), and it is determined whether the temperature exceeds the minimum temperature threshold (330). When the temperature of the first catalytic device 60 is less than the minimum threshold temperature, operation of the EHC 90 is enabled ('Enable EHC'), and a lambda split fuel injection strategy is enabled ('Enable λ Split') (340). The temperature of the first catalytic device 60 (320) is ongoingly monitored and compared to the minimum temperature threshold (330). When the temperature of the first catalytic device 60 exceeds the minimum temperature threshold, operation of the EHC 90 is disabled ('Disable EHC'), and the lambda split fuel injection strategy is disabled ('Disable λ Split') (350).

The lambda split fuel injection strategy comprises an engine control strategy that includes controlling fuel injection to the first set of combustion chambers 16 to operate at a rich air/fuel ratio, and controlling fuel injection to the second set of combustion chambers 16' to operate at a lean air/fuel ratio. A two pulse retarded spark ('TPRS') technique comprises both a lambda split fuel injection strategy and a spark retarding technique. The lambda split fuel injection strategy includes managing power output from the first and second combustion chambers 16 and 16'. The split injection strategy includes injecting two fuel pulses into the first combustion chambers 16 each combustion cycle, preferably during each compression stroke. The mass of fuel injected during the first fuel pulse is determined based upon an amount sufficient to operate the exemplary engine 10 to meet the operator torque request and other load demands. One or more subsequent fuel pulses are subsequently injected to the combustion chamber 16 during the combustion cycle to generate a rich exhaust gas feedstream. Preferably, a spark retarding technique is used in conjunction with the split fuel injection strategy to control power generated by the injected fuel. Retarding the spark discharge allows a portion of the fuel to go unburned and exit the combustion chamber 16 as exhaust, which can pass into the exhaust gas feedstream to the exhaust aftertreatment system. Preferably, the second combustion chambers 16' are run lean while the first combustion chambers 16 are run rich. The lambda split fuel injection strategy is preferably enabled after the first and second TWC 80 and 80' achieve minimum temperature thresholds. Preferably the minimum temperature threshold is based upon light-off temperatures of the first and second TWC 80 and 80'.

When the engine 10 is operated using the lambda split fuel injection strategy, a portion of the rich exhaust gas feedstream passes through the first TWC 80, to react with the lean feedstream that passed through the second TWC 80' in the EHC 90, thereby increasing the temperature of the exhaust gas feedstream passing into the first catalytic device 60, causing the first catalytic device 60 to increase in temperature.

During the key-on event (310), the control scheme 300 monitors the temperature of the first catalytic device 60. The engine 10 is run using the lambda split fuel injection strategy until the temperature of the first catalytic device 60 exceeds the minimum temperature threshold (330). When the temperature of the first catalytic device 60 exceeds the minimum temperature threshold, the control scheme 300 disables power to the EHC 90 and disables the lambda split fuel injection strategy (350). When the temperature of the first catalytic device 60 does not exceed the minimum temperature threshold, the EHC 90 and the lambda split fuel injection strategy remain enabled (340). Alternatively, the control scheme 300 may use separate minimum temperature thresholds for disabling the lambda split fuel injection strategy and the EHC 90 respectively. For example, the control scheme 300 may disable the lambda split fuel injection strategy at a first minimum temperature threshold and then disable the EHC 90 at a second minimum temperature threshold.

When the aftertreatment system 70 includes the second catalytic device 60' and second EHC 90', the control scheme 300 monitors a temperature of the second catalytic device 60' using a temperature sensor (not shown) placed proximately to the second catalytic device 60'. The control scheme 300 determines whether the temperature of the second catalytic device 60' exceeds the minimum temperature threshold. When the temperature of the second catalytic device 60' exceeds the minimum temperature threshold, the control scheme 300 disables power to the first and second EHCs 90 and 90' and disables the lambda split fuel injection strategy. Alternatively, the control scheme 300 may use separate minimum temperature thresholds of the first second EHCs 90 and 90' for disabling the lambda split fuel injection strategy, the power to the first EHC 90, and the power to the second EHC 90'.

Additionally, during a cold-start and engine run event, before the aftertreatment system 70 exceeds the minimum temperature threshold the control module 5 may shut the engine 10 off during an engine idling condition and/or during a vehicle deceleration, i.e., the engine shutoff method. As used herein the term 'engine off' refers to an engine operating state wherein the engine 10 is unfueled and not spinning or pumping air (e.g. valves deactivated). Vehicle deceleration may be determined based upon a monitored operator torque request or based upon a monitored speed of the vehicle. Shutting the engine 10 off prevents thermal heat transfer from the first and second catalytic devices 60 and 60' to the exhaust gas feedstream that occurs during engine idling and vehicle deceleration due to airflow through the first and second catalytic devices 60 and 60', thereby minimizing cooling of the first and second catalytic devices 60 and 60'. During a vehicle deceleration, the engine 10 may be shut off from the beginning of the deceleration until the vehicle accelerates from a stationary position, for example when the powertrain comprises a hybrid system capable of producing propulsion power without engine operation.

After achieving the minimum temperature threshold, a plurality of methods can be executed to maintain the temperature of the multiple devices of the aftertreatment system 70 above the minimum temperature thresholds.

A first method to maintain the temperature of the aftertreatment system 70 comprises the lambda split fuel injection strategy, comprising fueling the first set of combustion chambers 16 at an air/fuel ratio above stoichiometry and a second set of combustion chambers 16' at an air/fuel ratio below stoichiometry. The air/fuel variation above and below stoichiometry is preferably set so the overall engine air/fuel ratio is stoichiometric. Unburned fuel and CO emissions from the rich bank of cylinders 16 and excess oxygen from the lean bank of cylinders 16' pass through the TWC 80 and mix together upstream of the first catalytic device 60. The first catalytic device 60 oxidizes the unburned fuel and CO emissions thereby producing heat and raising the temperature of the first catalytic device 60. Preferably, the lambda split fuel injection strategy is utilized during engine idle conditions, vehicle decelerations, and/or when the vehicle is substantially stationary.

A second method to maintain the temperature of the aftertreatment system 70 comprises operating the EHC 90 to electrically heat the exhaust gas feedstream. The EHC 90 may be powered during engine idle conditions, vehicle decelerations, and/or when the vehicle is substantially stationary. The EHC 90 may operate to heat the exhaust gas feedstream before the TWC 80 achieves the temperature for catalyst light-off. The EHC 90 may be operated in conjunction with the lambda split fuel injection strategy. If the lambda split fuel injection strategy is used, operating the EHC 90 can facilitate chemical reactions in the exhaust gas feedstreams flowing from the first and second sets of combustion chambers 16 and 16'. The chemical reactions produce heat, thereby raising the temperature of the first catalytic device 60. When the aftertreatment system 70 includes the second catalytic device 60' and the second EHC 90', the second EHC 90' may additionally be used to heat the exhaust gas feedstream into the second catalytic device 60'.

A third method to maintain the temperature of the aftertreatment system 70 comprises shutting down the engine 10 in engine idling conditions, at a stationary position, and/or during a vehicle deceleration. Shutting down the engine 10 minimizes thermal heat transfer from the catalytic devices of the aftertreatment system 70 to the exhaust gas feedstream that can have a lower temperature during engine idle and vehicle deceleration conditions, thereby minimizing cooling. During vehicle decelerations, the engine 10 may be turned off from the beginning of the deceleration until the vehicle accelerates from a substantially stationary position. The engine shutoff method can additionally benefit fuel efficiency.

The abovementioned methods may be used alone or in combination. A first preferred method comprises using the engine shutoff method when the vehicle is at a stationary position, and using the engine shutoff method during decelerations until the vehicle accelerates from a stationary position. Optionally, the lambda split fuel injection strategy and/or the EHC 90 may be operated during engine idling. Optionally, the EHC 90 may be used during decelerations. Optionally, the EHC 90 may be operated during deceleration with the throttle valve 34 closed and the EGR valve 38 substantially wide open.

Another preferred method comprises operating the EHC 90 during deceleration with the throttle valve 34 closed and the EGR valve 38 substantially wide open and using the engine shutoff method when at a substantially stationary position, i.e., zero speed.

FIGS. 4-7 shows results operating an exemplary powertrain system including an aftertreatment system 70 equipped with the EHC 90 and a LNT device as a first catalytic device 60 over a standard New European Driving Cycle ('NEDC") to control exhaust gas feedstream temperature and temperature of the aftertreatment system 70.

Figure 4:
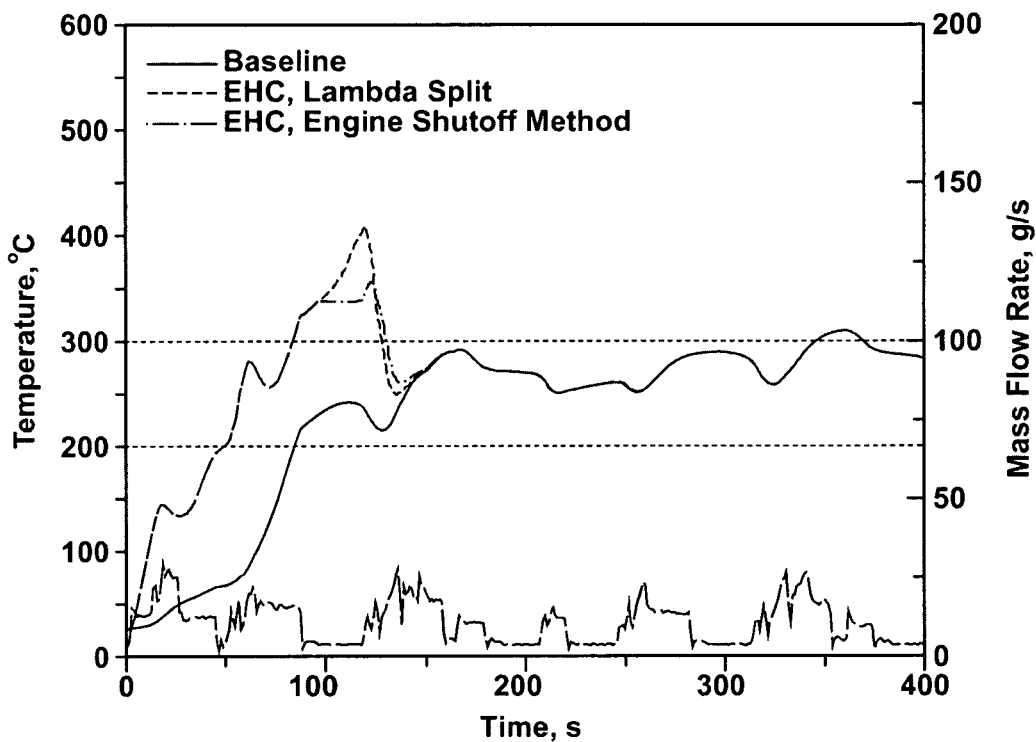
FIGS. 4-7 are datagraphs, in accordance with the present disclosure.

FIG. 4 shows results including the LNT device temperature ('Temperature, ° C.') as the EHC 90 operates to heat the exhaust gas feedstream during engine operation until a third engine idling period occurring approximately 117 seconds after start of the NEDC. FIG. 4 additionally shows a mass air flow rate ('Mass Flow Rate, g/s') indicating the exhaust gas feedstream through the LNT device over the NEDC. A first method depicted includes operating the EHC 90 until the third idling period and using the lambda split fuel injection strategy during the third engine idle period. The EHC 90 operates to heat the exhaust gas feedstream and chemically react emissions from the rich and lean banks of cylinders. A second method in FIG. 4 includes operating the EHC 90 to heat the exhaust gas feedstream until a third engine idling period and the engine shutoff method during the third engine idle period. The EHC 90 operates to heat the exhaust gas feedstream and the engine shutoff method prevents the thermal heat transfer from the hotter catalyst in the LNT device to the cooler exhaust gas feedstream that is present during engine idling. A baseline temperature is also shown in FIG. 4. The baseline temperature indicates the temperature of the LNT device during normal engine operation without operating the EHC 90, the lambda split fuel injection strategy, or the engine shutoff method during the NEDC. Operating the EHC 90 in conjunction with the lambda split fuel injection strategy or the engine shutoff method can achieve a temperature of 300° C. at approximately 80 seconds into the NEDC in one embodiment. The baseline temperature shows that the LNT device achieves 300° C. without operating the EHC 90, the lambda split fuel injection strategy, or the engine shutoff method at approximately 345 seconds into the NEDC in one embodiment.

Figure 5:
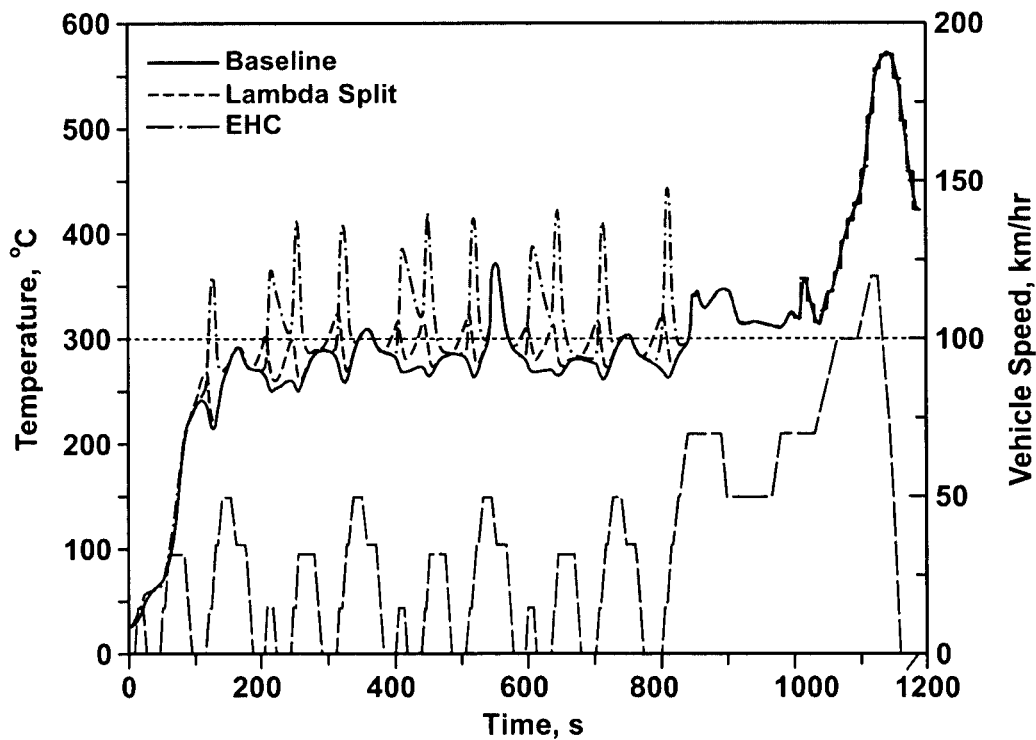

FIG. 5 shows results including temperature of the LNT device ('Temperature, ° C.') over the NEDC using two methods. A first method comprises using the lambda split fuel injection strategy ('Lambda Split') when the vehicle speed ('Vehicle Speed, km/hr') is substantially zero, i.e., stationary. The LNT device oxidizes the unburned fuel producing heat and raising the temperature of the LNT device. A second method comprises operating the EHC 90 ('EHC') to heat the exhaust gas feedstream during idle operations in the NEDC in one embodiment. FIG. 5 shows that using the lambda split fuel injection strategy when the vehicle is substantially zero achieves 300° C. at approximately 200 seconds into the NEDC in one embodiment, while operating the EHC 90 achieves 300° C. at approximately 110 seconds into the NEDC in one embodiment. The baseline method achieves 300° C. at approximately 325 seconds into the NEDC in one embodiment.

Figure 6:
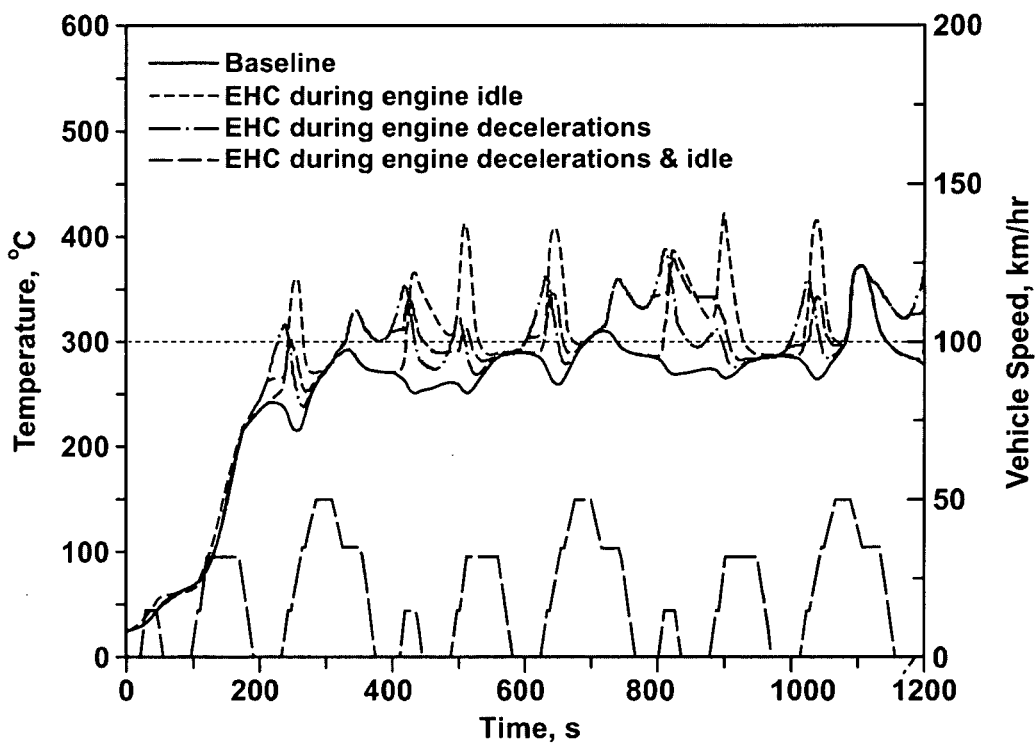

FIG. 6 shows results including temperature of the LNT device ('Temperature, ° C.') and vehicle speed ('Vehicle Speed, km/hr') over the NEDC using three methods. A first method shown in FIG. 6 comprises operating the EHC 90 to heat the exhaust gas feedstream during engine idle conditions. The first method achieves 300° C. at approximately 115 seconds into the NEDC in one embodiment. A second method shown in FIG. 6 comprises operating the EHC during engine decelerations. The second method achieves 300° C. at approximately 105 seconds into the NEDC in one embodiment. A third method shown in FIG. 6 comprises operating the EHC 90 during engine decelerations and during engine idle conditions. The third method achieves 300° C. at approximately 115 seconds into the NEDC and remains greater than 300° C. for most of the NEDC in one embodiment.

Figure 7:
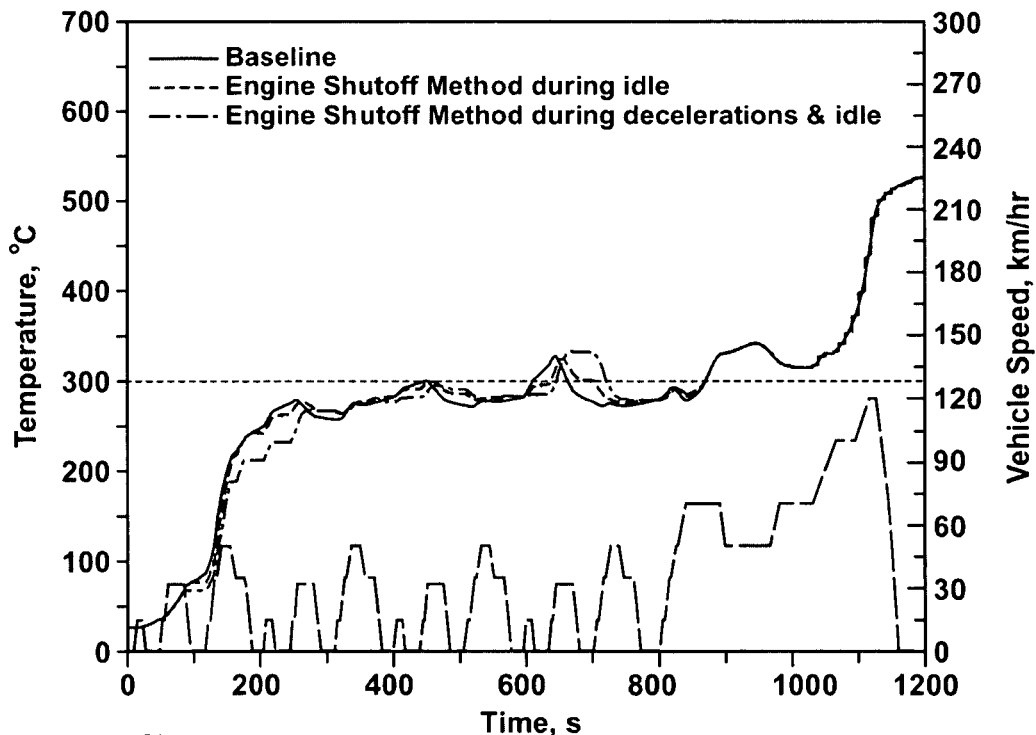

FIG. 7 shows temperature of the LNT device ('Temperature, ° C.') and vehicle speed ('Vehicle Speed, km/hr') over the NEDC using two methods. A first method comprises using the engine shutoff method after the engine 10 is idle. This method achieves 250° C. at approximately 200 seconds into the NEDC in one embodiment and 300° C. at approximately 450 seconds into the NEDC in one embodiment. A second method comprises using the engine shutoff method when the engine 10 is idle and during decelerations. This method achieves 250° C. at approximately 225 seconds into the NEDC in one embodiment and 300° C. at approximately 450 seconds into the NEDC in one embodiment. A baseline temperature is included. The baseline indicates the temperature of the LNT device during normal engine operation without shutting the engine 10 off. The baseline indicates achieving 250° C. at approximately 200 seconds into the NEDC in one embodiment and 300° C. at approximately 450 seconds into the NEDC in one embodiment.

One skilled in the art will appreciate that the methods excluding the lambda split fuel injection strategy described hereinabove can be executed on an aftertreatment system with one three-way catalytic converter. Preferably the three-way catalytic converter is close-coupled to the engine 10.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating an internal combustion engine selectively operative lean of stoichiometry, the method comprising:
   fluidly coupling a first aftertreatment device to exhaust ports of a first set of combustion chambers of the internal combustion engine;
   fluidly coupling a second aftertreatment device to exhaust ports of a second set of combustion chambers of the internal combustion engine;
   fluidly coupling a third aftertreatment device including a first supplemental heating device to outlets of the first and second aftertreatment devices;
   starting the engine after an extended off period; and
   only when the temperature of the third aftertreatment device is less than a minimum threshold temperature defining a minimum acceptable temperature for the third aftertreatment device to effectively oxidize NOx in the exhaust gas feedstream and only after the first and second aftertreatment devices achieve respective temperature thresholds where each respective temperature threshold defines light-off temperatures of the respective first and respective second aftertreatment devices, enabling a lambda split fuel injection strategy comprising operating the first set of combustion chambers at a rich air/fuel ratio and operating the second set of combustion chambers at a lean air/fuel ratio and operating the first supplemental heating device to transfer thermal energy to an exhaust gas feedstream and only retarding spark timing of the first set of combustion chambers.

2. The method of claim 1, further comprising fluidly coupling a fourth aftertreatment device including a second supplemental heating device to an outlet of the third aftertreatment device.

3. The method of claim 1, further comprising:
   monitoring temperature of the third aftertreatment device;
   operating the first and second combustion chambers at a stoichiometric air/fuel ratio and discontinuing operating the first supplemental heating device when the temperature of the third aftertreatment device exceeds a predetermined temperature threshold.

4. The method of claim 1, further comprising:
   equipping a vehicle with the engine;
   monitoring a speed of the vehicle; and
   shutting off the engine during vehicle deceleration.

5. The method of claim 1, further comprising:
   equipping a vehicle with the engine;
   monitoring a speed of the vehicle; and
   shutting off the engine when one of the speed of the vehicle is zero and the engine is idle.

6. Method for controlling a vehicular internal combustion engine selectively operative lean of stoichiometry, the method comprising:
   equipping the engine with an aftertreatment system comprising a first aftertreatment device fluidly coupled to exhaust ports of a first set of combustion chambers of the engine, a second aftertreatment device fluidly coupled to exhaust ports of a second set of combustion chambers of the engine, and a third aftertreatment device including a first supplemental heating device fluidly coupled to outlets of the first and second aftertreatment devices;
   only when the temperature of the third aftertreatment device is less than a minimum threshold temperature defining a minimum acceptable temperature for the third aftertreatment device to effectively oxidize NOx in the exhaust gas feedstream and only after the first and second aftertreatment devices achieve respective temperature thresholds where each respective temperature threshold defines light-off temperatures of the respective first and respective second aftertreatment devices, enabling a lambda split fuel injection strategy comprising selectively operating the first set of combustion chambers at a rich air/fuel ratio and the second set of combustion chambers at a lean air/fuel ratio and only retarding spark timing of the first set of combustion chambers; and
   selectively operating the first supplemental heating device.

7. The method of claim 6, further comprising fluidly coupling a fourth aftertreatment device including a second supplemental heating device to an outlet of the third aftertreatment device.

8. The method of claim 7, further comprising selectively operating the engine in an engine-off operating state.

9. The method of claim 8, further comprising:
   detecting a vehicular deceleration event; and
   operating the engine in the engine-off operating state during the vehicular deceleration event.

10. The method of claim 7, further comprising:
    detecting a vehicular deceleration event; and
    operating one of the first supplemental heating device and the second supplemental heating device during the vehicular deceleration event.

11. The method of claim 10:
    the engine comprises an intake manifold and an intake throttle valve;
    the aftertreatment system further comprises an external flow passage configured to recirculate exhaust gases from the first and second aftertreatment devices to the intake manifold; and
    wherein during the vehicular deceleration event the method further comprises
       recirculating exhaust gases from the first and second aftertreatment devices to the intake manifold during a deceleration event, and
       closing the intake throttle valve.

12. The method of claim 7, further comprising operating the first supplemental heating device when the engine is operating at idle.

13. The method of claim 7, further comprising:
    detecting a vehicular deceleration event; and operating the first supplemental heating device during the vehicular deceleration event.

14. Method for operating a vehicle including an internal combustion engine selectively operative lean of stoichiometry, the method comprising:
  equipping the engine with an aftertreatment system comprising a first aftertreatment device fluidly coupled to exhaust ports of a first set of combustion chambers of the engine, a second aftertreatment device fluidly coupled to exhaust ports of a second set of combustion chambers of the engine, and a third aftertreatment device including a supplemental heating device fluidly coupled to outlets of the first and second aftertreatment devices;
  only when the temperature of the third aftertreatment device is less than a minimum threshold temperature defining a minimum acceptable temperature for the third aftertreatment device to effectively oxidize NOx in the exhaust gas feedstream and only after the first and second aftertreatment devices achieve respective temperature thresholds where each respective temperature threshold defines light-off temperatures of the respective first and respective second aftertreatment devices, enabling a lambda split fuel injection strategy comprising selectively operating the first set of combustion chambers at a rich air/fuel ratio and the second set of combustion chambers at a lean air/fuel ratio and only retarding spark timing of the first set of combustion chambers;
  selectively operating the supplemental heating device; and
  selectively operating the engine in one of an engine-on operating state and an engine-off operating state.

15. The method of claim 14, further comprising:
monitoring a speed of the vehicle; and
operating the engine with the first set of combustion chambers at a rich air/fuel ratio and the second set of combustion chambers at a lean air/fuel ratio when the speed of the vehicle is zero.

16. The method of claim 14:
wherein the engine comprises an intake manifold and an intake throttle valve;
wherein the aftertreatment system further comprises an external flow passage configured to recirculate exhaust gases from the first and second aftertreatment devices to the intake manifold; and
wherein during a vehicular deceleration event the method further comprises
  recirculating exhaust gases from the first and second aftertreatment devices to the intake manifold, and
  closing the intake throttle valve.

17. The method of claim 14, further comprising:
monitoring a speed of the vehicle; and
operating the engine in the engine-off operating state when the vehicle speed is zero.

18. Method for operating a vehicle including an internal combustion engine comprising an intake manifold and an intake throttle valve, the engine selectively operative lean of stoichiometry, the method comprising:
  equipping the engine with an aftertreatment system comprising a first aftertreatment device fluidly coupled to a plurality of exhaust ports of the engine, a second aftertreatment device including a supplemental heating device fluidly coupled to outlets of the aftertreatment device, and configured to recirculate exhaust gases from the first aftertreatment device to the intake manifold;
  only when the temperature of the third aftertreatment device is less than a minimum threshold temperature defining a minimum acceptable temperature for the third aftertreatment device to effectively oxidize NOx in the exhaust gas feedstream and only after the first and second aftertreatment devices achieve respective temperature thresholds where each respective temperature threshold defines light-off temperatures of the respective first and respective second aftertreatment devices, enabling a lambda split fuel injection strategy comprising operating the first set of combustion chambers at a rich air/fuel ratio and operating the second set of combustion chambers at a lean air/fuel ratio and selectively operating the supplemental heating device and only retarding spark timing of the first set of combustion chambers;
  selectively operating the engine in one of an engine-on operating state and an engine-off operating state;
  recirculating exhaust gases from the first aftertreatment device to the intake manifold during a vehicular deceleration event; and
  closing the intake throttle valve when operating the supplemental heating device.

\* \* \* \* \*